April 4, 1950  R. L. HARVEY ET AL  2,503,155
VARIABLE INDUCTANCE DEVICE
Filed May 18, 1948  3 Sheets-Sheet 1
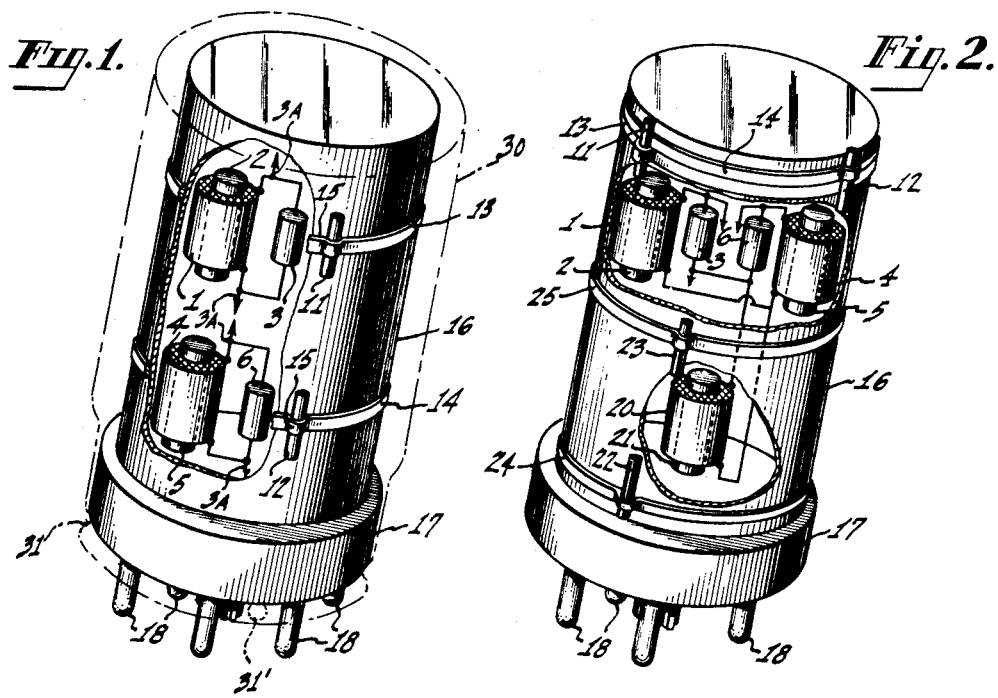
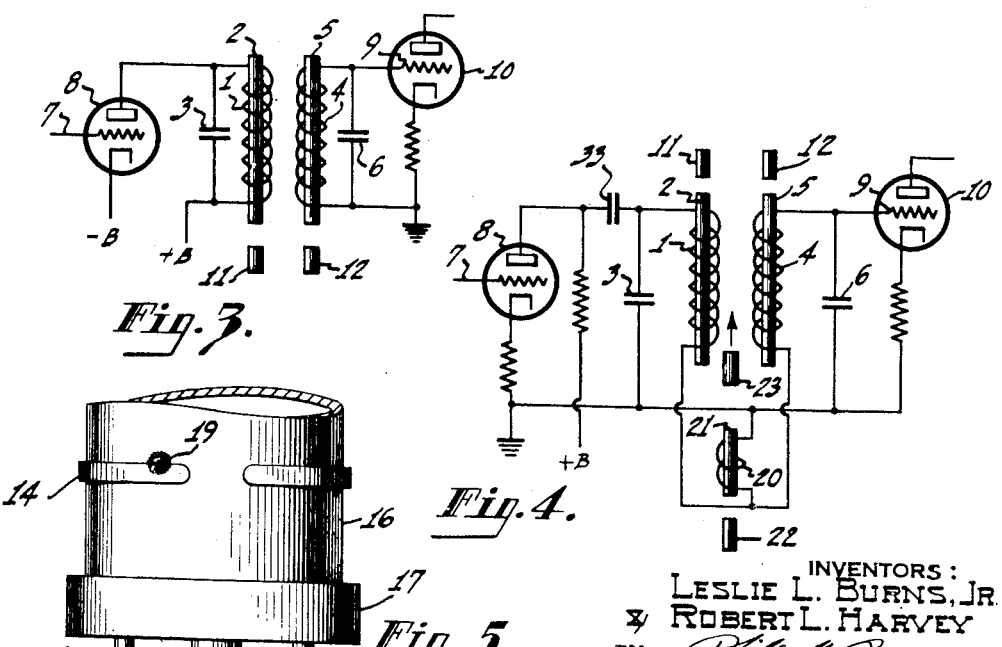
INVENTORS:
LESLIE L. BURNS, JR.
& ROBERT L. HARVEY
BY *Philip ... Cooper*
ATTORNEY

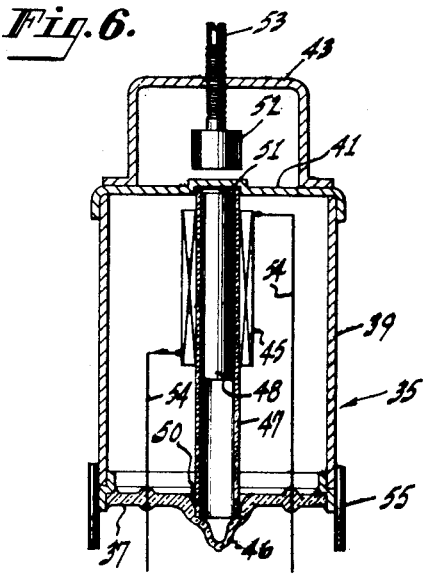
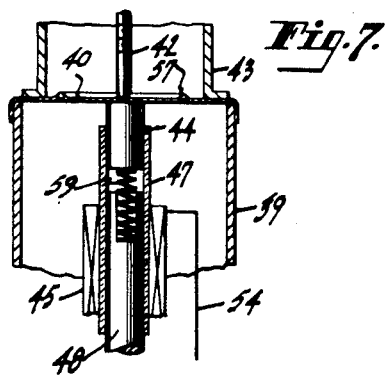
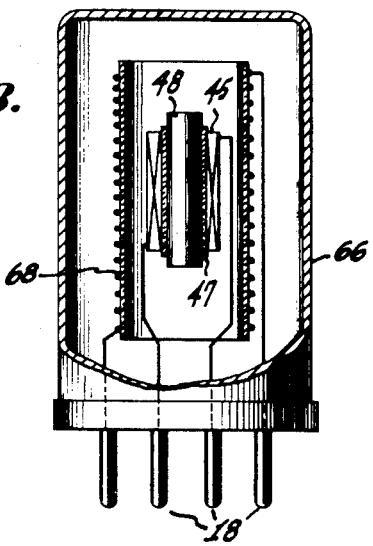

April 4, 1950
R. L. HARVEY ET AL
2,503,155
VARIABLE INDUCTANCE DEVICE
Filed May 18, 1948
3 Sheets-Sheet 3
Fig. 9.
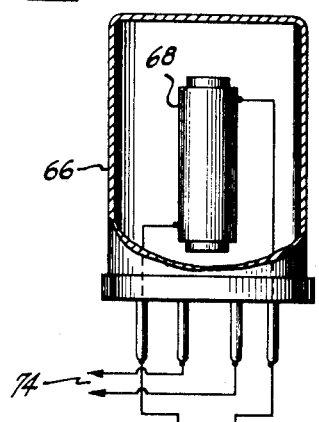
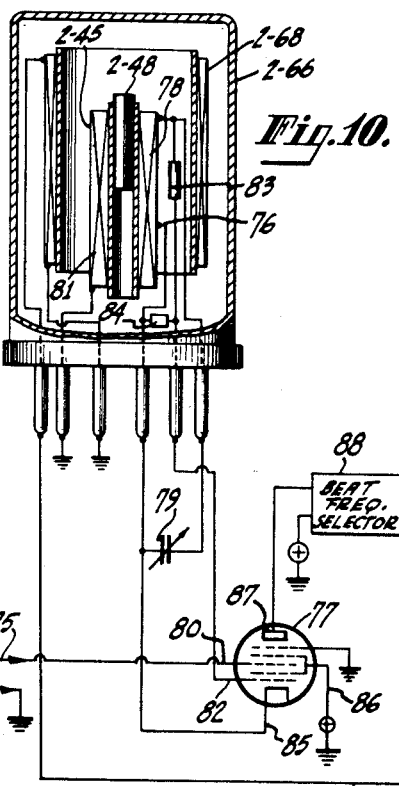
Fig. 10.
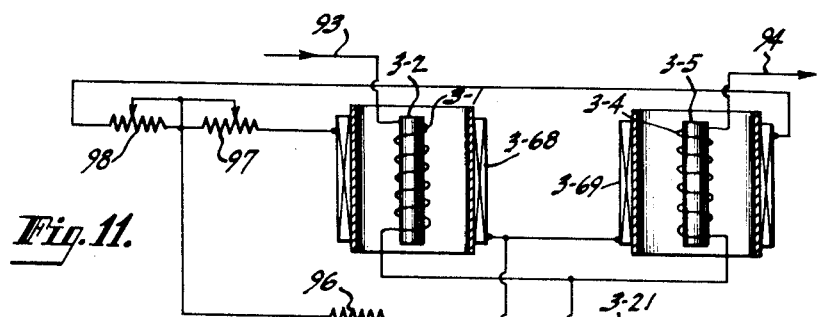
Fig. 11.
INVENTORS
LESLIE L. BURNS JR
& ROBERT L. HARVEY
BY Philip G. Cooper
ATTORNEY Patented Apr. 4, 1950

2,503,155

UNITED STATES PATENT OFFICE 2,503,155

VARIABLE INDUCTANCE DEVICE

Robert L. Harvey and Leslie L. Burns, Jr., Princeton, N. J., assignors to Radio Corporation of America, a corporation of Delaware Application May 18, 1948, Serial No. 27,783

9 Claims. (Cl. 171—242)

This invention relates to electrical inductance systems and more particularly to such systems in which the inductance is adjustable and may be connected in a tunable resonant circuit.

Attempts have heretofore been made to provide a practical sealed-in inductor construction to better preserve its inductance as contributed by windings, for example, as well as condensers that may be incorporated for coupling or forming a resonant circuit with the inductance, against the deteriorating effects of atmospheric components such as moisture, oxygen, etc. However the practical requirement for having the inductor circuit adjustable as by varying the inductance or connected capacitances, has been a major obstacle to this development. As a result, inductance systems available at present are still subject to deterioration and drift of their circuit characteristics.

Among the objects of this invention are the provision of novel inductor systems of simple construction in which an adjustable inductance together with any desired resonating or coupling capacitors, is sealed within a suitable container.

Further objects of the invention are the provision of novel inductor systems having inductance-controlling high permeability magnetic material in the magnetic field of an inductor coil and enclosed with the coil within the imperforate walls of a sealing receptacle.

The above as well as other objects of the invention will be more readily understood from the following description of exemplifications thereof, reference being had to the annexed drawings wherein:

Fig. 1 is a perspective view with parts broken away and shown schematically of one form of inductance system of the invention.

Fig. 2 is a view similar to Fig. 1 of a modified form of the invention.

Figs. 3 and 4 are circuit diagrams illustrating the utilization of the constructions of Figs. 1 and 2 respectively.

Fig. 5 is a detail view of a portion of the exterior of the systems shown in Figs. 1 and 2.

Fig. 6 is a sectional view of a further form of the invention;

Fig. 7 is a view of a modified portion of the construction of Fig. 6 showing a further embodiment of the invention;

Fig. 8 is a view similar to Fig. 6, partly in section, of a still further construction incorporating the invention;

Figs. 9 and 10 are circuit diagrams showing adjustable inductance arrangements utilizing the inductor construction of Fig. 8; and Fig. 11 is a circuit diagram of a coupling network incorporating features of the construction of Figs. 2 and 8.

According to the invention a novel and simple inductor construction is provided by an inductor coil and a magnetic material of high permeability but capable of changing its permeability as a function of the intensity of an applied magnetic field. The material is located in the magnetic field of the coil whose effective inductance is to be varied. The material, the coil and other associated circuit components, such as resonating or coupling capacitors, are mounted within a sealed enclosure. The sealing may be hermetic for completely preventing deterioration by exposure to the atmosphere. Circuit adjustment is provided by applying a magnetic field of controllable intensity to the material to thereby adjust its permeability and accordingly vary the coil inductance.

Fig. 1 shows one form of the invention wherein the inductance system is an intermediate frequency transformer of the type suitable for use in conventional super-heterodyne radio receivers. In this construction the permeability-varying material is in the form of a core insertable within the turns of the inductance windings. An inductance coil 1 having such a core 2 is connected in parallel with a resonating capacitance 3 by circuit leads some of which are represented by arrows 3A. Another similar assembly of a second coil 4, core 5 and capacitor 6 is shown as arranged so that the two coils are magnetically coupled for transferring electrical signals from one coil to the other.

The coils, cores and condensers are contained within a receptacle 16 having imperforate walls which seals the enclosed components from the ambient atmosphere. The specific arrangement for sealing the receptacle forms no part of the present invention and any suitable conventional sealing technique may be used. As one example, the receptacle may include a base 17 from which prongs 18 project in a manner similar to that used in space discharge tube manufacture. The prongs 18 form externally exposed conductive surfaces insulated from each other as by forming the base 17 of electrically non-conductive material. The sealed components may be held in place in any convenient manner as by providing suitably supported hollow coil forms around which the coils 1, 4 are wound and inside of which the cores 2, 5 are held.

The outer walls of receptacle 16 surrounding the inductors may be of metallic or non-metallic composition such as glass or plastic. When metallic walls are used in the construction of Fig. 1, the metal should be non-magnetic or only slightly magnetic.

Adjustment of the inductances for tuning the circuits of the construction of Fig. 1, is provided by utilizing for the high permeability cores 2, 5, a material having a permeability which depends on the intensity of magnetic flux to which it is subjected, and at the same time providing magnetic flux intensity varying structure to adjust the core permeability. Inasmuch as the inductances of the coils 1, 4 depend upon the permeability of the surrounding field space, the inductance values are controlled as desired.

In the form shown in Fig. 1, the magnetic flux intensity-varying structures are permanent magnets 11, 12 mounted exteriorly of the receptacle 16 as by the friction bands 13, 14 respectively. These bands may be resiliently biased to contract, and they extend around the receptacle periphery by an amount sufficient to cause the resilient contracting tendency to hold them securely in place against displacing forces of the kind applied through normal handling. Thus the inadvertent shifting of the bands 13, 14 under the influence of inertia and the like may be substantially completely prevented and only the direct application of shifting forces, as by direct engagement of a shifting tool with the band, will effect its movement. As shown, the permanent magnets 11, 12 may be held in properly shaped sockets 15 formed in the respective bands which may be of spring metal and grip the magnets securely.

In the above construction the permanent magnets may be moved closer to or further away from the coil cores 2, 5 by merely shifting the position of the magnet carrying bands on the exterior of the receptacle. Inductance controlling movements may be in directions parallel to the core axis or transversely of the core axis or any combination of such movements. Additionally, the magnetic field strengths at the cores 2, 5 induced by magnets 11, 12 may be controlled by moving the magnets in their respective sockets 15 without shifting of the bands 13, 14. Where transverse magnet shifting is relied upon at least in part, the cores 2, 5 should be displaced from the axis around which the magnets move as shown in Fig. 1. On the other hand, where transverse shifting is not needed the receptacle may be of rectangular, square, polygonal or other non-circular transverse section. In the cylindrical form shown in Fig. 1, the walls may be grooved to receive the bands and further impede inadvertent shifting.

Suitable materials for use as the high permeability cores 2, 5 are the ferrites which show permeability changes under varying magnetic field strengths. Some of these ferrites are described in the Harvey et al application Serial No. 719,594, filed December 31, 1946, and the Leverenz et al application Serial No. 776,292, filed September 26, 1947. These ferrites include the mixed zinc, magnesium ferrites such as one containing equal mol proportions of zinc ferrite and magnesium ferrite, and may be prepared in such manner as to exhibit desirable temperature characteristics, as described in the last-mentioned application. With such variable permeability material the magnets 11, 12 may be of quite low strength and need not be positioned very close to the cores.

Other core compositions are also suitable for use with the invention. Thus, magnetic iron oxide or bonded high permeability easily saturated powdered metals such as the specially developed iron alloys containing about 80 percent nickel also form satisfactory core materials. The latter materials have permeabilities that are less sensitive to field intensity changes and are used with stronger and/or less distant magnets. Suitable magnets 11, 12 may be formed of the conventional high-remanent materials such as the specially developed alloys of aluminum, nickel, cobalt and iron, or bonded mixed iron and cobalt oxides. In general, however, any permanent magnet compositions including ordinary carbon steels are quite satisfactory. The mixed iron and cobalt oxides have the added advantages of supplying a high field strength from a relatively small magnet mass. They can accordingly be made of such light weight that they are less subject to inadvertent shifting due to inertia effects.

The magnets and their securing band, may be shaped so that they interlock, as by notching the magnets where they are held in the pockets 15 thereby preventing slippage along the pocket longitudinally of the receptacle. On the other hand, since the longitudinal shifting of the bands along the receptacle may not be smooth enough for readily making fine adjustments, the magnets may be arranged for longitudinal shifting with respect to the bands whose resiliency or springiness may be alone relied on for frictionally holding the magnets against unintentional shifts. The band pockets may be shaped to extend around substantially more than half the magnet periphery and may normally have a smaller radius of curvature so that when the magnets are inserted, the pockets are expanded and exert substantially higher frictional holding forces. Alternatively the magnets and the band pockets may be made of rectangular or square cross section with the side walls of the pockets deformed inwardly for more securely gripping the magnets.

The circuit leads 3A may be connected to individual prongs 18 in any suitable manner such as used in the conventional space discharge tube techniques and the entire receptacle may be connected in a radio receiver circuit as by merely plugging the base portion into a suitably shaped socket so that the prongs establish the desired circuit connections. To guard the construction from the influence of stray D. C. magnetic fields, a magnetic shield 30 shown in the form of an inverted cup may be placed around it and held as by frictional engagement between the receptacle base 17 and inwardly directed extensions indicated by the bulges or indentations 31. Any undesired effects from unshielded portions of the receptacle such as its bottom may be diminished by mounting the magnetically susceptable components as far away from the unshielded portions as possible. If desired the socket or other member adjacent to which the receptacle is mounted may include a magnetic shield for diminishing undesired external magnetic influences on adjacently positioned parts of the receptacle, such as its bottom, which may not be shielded by the receptacle construction itself. Alternatively, the receptacle may include additional or separate magnetic shield portions held in such manner as to permit the desired inductance adjustments. The shields should include material of high magnetic permeability such as iron or the specially developed alloys to minimize the effects of external D. C. magnetic fields. At the same time movable shields such as shown at 30 should be arranged so as not to interfere with adjustments, as by spacing them sufficiently from the region of the magnets 11, 12 or by arranging the shield so that magnet shifting tools may penetrate it to make adjustments with the shield in place. Small perforations in the shield permit such penetration without significantly affecting the shielding action.

Fig. 3 illustrates one circuit arrangement in which the form of the invention shown in Fig. 1 may be used. It is here shown as providing an interstage transformer coupling between an input stage including space discharge tube 8 and an output stage including space discharge tube 10. The stages may be operated as conventional amplifiers or as converters or mixers in any suitable manner. The tubes 8, 10 may be of the pentode or other suitable type having respective signal input grids 7, 9 to which incoming signals are supplied for amplification and/or frequency conversion. It will be noted that the transformer components function in the manner well known to experts in the art to couple the stages and transfer the signals from tube 8 of the incoming stage to the input of tube 10 for further treatment, such as amplification. For this purpose the circuit components 1, 3 are tuned to resonate and present a high impedance to the band of frequencies to be transferred. This is accomplished by merely shifting magnet 11 until the magnetic field strength of core 2 is such that its permeability imparts the necessary inductance to the coil 1. In a similar manner the circuit components 4, 6 are correspondingly tuned by adjusting the position of magnet 12. When all the circuit components are adjusted the system operates in the conventional manner. Instead of an output circuit including amplifier tube 10 as shown in Fig. 3, a demodulating output stage may be connected as is well known in the art.

The form of the invention shown in Fig. 1 may be suitably tuned with only a single magnet positioned to generate the inductance-controlling fields for both cores 2 and 5. Tuning of either inductance is readily accomplished by moving the single magnet in a path that defines a locus of points at which the field intensity at the core of the other inductance is constant. The initial adjustment may be accomplished by tuning one inductance by any convenient magnet shifting movements, after which the other inductance is tuned and both may be retuned by moving the magnet along a path in which it does not change the field strength at the core of the inductance not being tuned. For convenience in making the last type of adjustment, the receptacle may carry indications such as line markings of a family of paths defining the loci of uniform field strength magnet positions for each of the cores. These adjustments may then be made by merely moving the magnet in such manner that it remains in a generally uniform relationship with respect to one or more of the guide lines corresponding to one core while it changes the field strength at the other core.

The inductance system of the invention may be in the form of a tuned or untuned coupling inductance having only a single winding, as by omitting one of the tuning condensers 3, 6 and the corresponding adjusting magnet.

A feature of the invention is the simplicity of construction in which the sealed container is readily and inexpensively manufactured. Furthermore the inductances provided have the desirable relatively high "Q" or electrical efficiency characteristic of coils that are combined with high permeability material in their fields.

Fig. 2 shows a modification of the invention. This form incorporates a band pass transformer in which the coupling as well as the resonance of the circuits is adjustable. The construction may be generally similar to that of Fig. 1 having an input coil 1, variable permeability core 2 and condenser 3 for the input coil, and a similar output combination of output coil 4, core 5 and condenser 6. A third coil 20 and associated core 21 is also included and connected with the input and output coils 1, 4 to provide a mutual inductance. One circuit arrangement for this purpose is shown in Fig. 4 in which input and output circuits may be similar to those described in connection with Fig. 3. The components are shown connected so that coil 1 in series with coil 20 forms a parallel resonant input circuit with condenser 3, and coil 4 in series with coil 20 forms a parallel resonant output circuit with condenser 6. The coil 20 which is common to both input and output circuits may by its inductance which is mutual to the two circuits provide the only coupling, so that the magnetic linkage between the coils 1 and 4 as in Fig. 1, may be diminished or entirely eliminated.

The apparatus of Fig. 2 also includes a plurality of inductance-adjusting flux-varying elements shown as individual magnets 11, 12, 22 and 23 adjustably held on bands 13, 14, 24 and 25 respectively in a manner similar to that described in connection with the corresponding components of Fig. 1. Magnets 11 and 12 may be positioned adjacent the cores 2 and 5 respectively so that they control the permeabilities of these cores but do not appreciably affect the others. Magnet 22 similarly controls essentially only the inductance of coil 20. Magnet 23 however is arranged to simultaneously control the inductances of all the coils. As shown in Figs. 2 and 4 magnet 23 may be located generally intermediate the mutual inductance coil 20 and the other coils so that when moved away from coil 20 and toward the other coils its field at core 21 decreases in intensity while at the same time its fields at cores 2 and 5 both increase in intensity. Accordingly when the cores are of the type that decrease in permeability with increased field strength, the inductance of coil 20 increases and the inductances of coils 1 and 4 decrease. These changes may be arranged to be compensatory so that the overall inductance and resonance of each circuit remains substantially unchanged. However the relative proportion of each circuit inductance which is mutual to the two circuits is thereby changed so that the coupling and transfer characteristics between the circuits are changed in accordance with the established relation $$K = \frac{M}{\sqrt{L_1 L_4}}$$

Where K is the coefficient of coupling

M is the mutual inductance
$L_1$ is the inductance of coil 1, and
$L_4$ is the inductance of coil 4.

In the adjustment example given, the coefficient of coupling is decreased so that if the circuits were previously overcoupled, the coupling and the band width would be diminished. However this is accomplished without detuning either circuit. Where the level of band pass response is to be kept approximately uniform over the band width notwithstanding changes in coupling, the common coil 20 may be arranged to inject losses at the same time as it increases in inductance. By this arrangement, as the coupling is increased when raising the mutual inductance, the loading also increases and the overall band-pass response, although increasing in band width, remains approximately uniformly distributed over the band-width. The losses may be incorporated by forming the coils and/or the cores of relatively high loss materials for the signal frequencies involved. Such a system is capable of high quality performance with any selected coupling.

Magnets 11, 12 and 22 enable tuning of the circuits independently of the band width control. If desired however, the magnet 22 may be omitted so that the input and output circuits may be simply tuned by the respective magnets 11, 12. Inasmuch as the coils 1, 4 may be located at an appreciable distance from each other to minimize magnetic coupling, a single tuning magnet may be used to tune both in the manner described in connection with Fig. 3.

The band-pass control magnet 23 may be provided with more convenient adjusting arrangements such as a mechanical linkage extending out through any shields that may surround the structures. The linkage may be connected with an operating control readily available on the exterior of the system so that it is not necessary to reach into awkward locations to change the band-width. Where more than one transformer of the type shown in Fig. 2 is included in a signal receiver such is the conventional radio receiver sets, the band width controls may be ganged for simultaneous operation. As shown in Fig. 4, the conductive connection between the circuits requires the insertion of a blocking capacitance 33 to keep the high D. C. plate voltage of tube 8 away from the input grid of tube 10. The blocking capacitance may be in the plate connection of tube 8, as shown, or in the grid connection of tube 9. Where an AVC connection is made to grid 9, a blocking condenser is generally inserted in the connection to this grid so that no further blocking is needed. The blocking condenser in either or both circuits may be incorporated in the sealed inductor receptacle 16.

According to the invention, the inductor tuning elements may be arranged to be anchored in place after the tuning is completed as by the application of adhesive to the magnets or the bands to hold them more firmly fixed against the receptacle. Fig. 5 shows such an arrangement in which a spot of adhesive 19 such as resinous cements or solder holds the band 14 to the outer wall 16.

Fig. 6 shows a further form of the invention. Here the inductor sealing receptacle incorporates magnetic shield structure. As shown a receptacle 35 includes a base 37, side walls 39, top wall 41 and cap 43. Inductance coil 45 is held on a pin or form 47 within which a variable permeability core 48 is mounted. The form may be fixed between retaining elements shown as including a socket 50 in the base 37 and an aligned socket 51 in the top wall 41. Either or both of the retaining elements may be inwardly directed pins engageable within hollowed ends of the coil-holding pin or form 47. Within the cap 43 a flux-varying structure 52, which may be a permanent magnet, is adjustably held as by pin 53 projecting through and threadedly received in the walls of the cap.

The side walls 39 and the cap 43 may be of high permeability magnetic shield material to substantially completely magnetically isolate the contents of the receptacle. Top wall 41 may be of non-magnetic or slightly magnetic material so that the flux generated at 52 readily permeates and controls the permeability of core 48. The magnet 52 is adapted for simple adjustment with respect to the core as by slotting the end of pin 53, enabling it to be turned by a tool like a screwdriver.

Leads 54 from the coil may be passed through the base 37 which may be of insulating plastic composition such as glass which will provide an effective seal against the leads. The base may also be sealed to the side walls 39 as by interposing a suitable surface having proper sealing characteristics with the base. The specific manner of sealing forms no part of the present invention and many such techniques are well known in the space-discharge tube art. The top wall 41 may also be sealed to the side walls 39, as by soldering, or welding to provide hermetic sealing, if desired. Inasmuch as the cap 43 and its contents form no part of the inductance or its connected circuit elements, and since it is impossible to adequately seal the penetration of the externally projecting control, the cap need not be sealed. With glass bases, the lower portions of socket 50 may be extended to form a narrow sealing extension 46 which may be used to evacuate the receptacle or fill it with a desired protective or inert medium, as is well known in the art.

The inductor of Fig. 6 may be arranged to be detachably plugged into a connecting socket, as described in connection with Fig. 1, or it may be provided with other securing means such as the threaded spaced lugs 55 for holding it in place where desired. Circuit connections may be made directly to the projecting ends of leads 54 as by soldering or using friction contacts. The receptacle 35 may be of any desired transverse configuration such as circular, elliptical, rectangular, square, polygonal, etc.

Fig. 7 shows one form of a modification of the invention in which the sealed receptacle houses all the inductor components and the flux-varying structure as well. This construction is generally similar to that of Fig. 6 but it has a resiliently deformable top wall 40 carrying a magnet 44 on its inner face. An adjusting pin 42 engaging the top wall 40 opposite the magnet 44 is arranged, as by threaded engagement with the cap 43 in the manner shown in connection with Fig. 6, for example, to push against and deform the wall 40 thereby forcing the magnet 44 closer to the variable permeability core 48, or permitting the magnet to be retracted as desired. The magnet 44 may be held against the wall 40 in any convenient manner as by inserting a non-magnetic spring 59 between the magnet and the core 48 or by mounting the magnet on a pin anchored and sealed to the top wall. Molded mixed iron and cobalt oxide magnets are particularly simple to prepare with a pin receiving passageway or a spring receiving socket where desired. The upper end of the coil form 47 may be fixed in place by supports (not shown) extending from the side walls 39 or by inserting a resiliently yieldable collar around the magnet 44 between the upper edge of the form and the top wall 40. Since for tuning inductances to a fixed resonance, as in intermediate frequency transformers of superheterodyne type radio receivers, not much inductance latitude is needed, the range of magnet movement is not so much as to require undue deformation of the wall 40. If desired however, the wall may be corrugated as shown at 57 to increase its deformability.

Fig. 8 shows a further embodiment of the invention in which the flux-varying structure and the inductor components are mounted wholly within the sealed enclosure. In this form a receptacle 66, which may be similar to that shown in Fig. 1, houses an electromagnet magnetizing winding 68 in addition to the inductor coil 45, core 48 and supporting form 47. Leads from the electromagnet as well as the coil are shown as brought out to plug-in prongs 18 for connection with a socket wired in the desired circuits. The electromagnet may have many turns of wire so that it requires very little energizing current to produce the strongest magnetic field required. As little as a few milliamperes may be all that is needed. The magnet energizing source may include an effective adjustable current or voltage regulator together with a controllable impedance in a stable system which is relatively insensitive to temperature changes such as those produced by the flow of magnetizing current. The impedance may be adjustable for varying the inductance as desired.

Fig. 9 shows one example of an adjustable inductor arrangement embodying the construction of Fig. 8. A constant voltage source 70, which may conveniently be a combination of a conventional commercial A. C. power line rectifier, filter and voltage regulating tube supplying unvarying D. C. voltage, is connected through adjustable impedance 72 to the flux-varying windings 68 of the sealed-in inductor assembly 66. Leads 74 connected to the inductor elements are inserted in the desired inductance circuit. The adjustable impedance 72 may merely be an adjustable resistance in series with the flux-varying windings 68.

The form of the invention shown in Fig. 8 is particularly suited to respond to electrical controls. By way of example where it is used for signal selection as in an oscillator tank circuit, the electromagnet may be energized by a discriminator connected to the oscillator output, for opposing and balancing any frequency drift. In tunable oscillators embodying this construction, the tank circuit may be tuned capacitively so as not to complicate the automatic inductance control. Adjustability for the capacitance and/or the electromagnet current independently of the tuning control is also desirable to simplify the setting of the circuit for automatic operation.

Fig. 10 shows such an automatic frequency control system in a circuit arrangement corresponding to a conventional type of radio receiver. The circuit arrangement includes a high frequency signal input connection 75 to a control grid 80 of a heterodyne or mixer stage comprising of a pentagrid converter tube 77, sealed-in oscillator coil assembly 2—66 and tuning condenser 79. The coil assembly has windings 2—45 tapped at 76 to provide two sections 78, 81 in a conventional Hartley type oscillator circuit in which only the turns 78 of the coil windings on one side of the tap 76 are tuned by the tuning condenser 79. Only these turns 78 need be exposed to the variably permeable field space provided by a core 7—48 having a permeability determined by the field strength, as described above. The turns 78 and capacitor 79 form a resonant tank circuit supplying the oscillator grid 82 of the converter tube through capacitor 83 which is shown included in the sealed receptacle. Oscillator grid resistor 84 may also be sealed in, as shown. The converter tube cathode 85 is connected to the center tap 76 of the tank circuit and the outer end of the turns 81 is grounded. Screen grids 86 and plate 87 of the converter tube are suitably supplied with operating potential as indicated by the circled + signs and the converter output from its plate 87 is fed through a beat frequency selector network 88 to a beat frequency utilizer 89 which may be signal amplifying and reproducing elements such as loud speakers or kinescopes. Part of the beat frequency output is also supplied to a discriminator 90 which may be of the sloping filter type that develops a voltage varying in magnitude in proportion to the frequency of the supplied signals. The discriminator 90 may also include a rectifier and amplifier for delivering to an output circuit 91 appreciable amounts of direct current in accordance with the deviation of the beat signals from a predetermined frequency.

Flux varying windings 2—68 within the oscillator coil assembly are connected with the output circuit for causing variations in output current to correspondingly vary the tuning of the oscillator tank and return the beat signals to the predetermined frequencies. Similar automatic inductance control may be provided for selective coupling circuits having one or more inductances. In the case of coupling circuits with a plurality of inductors, as in the coupling transformer type shown in Figs. 1 and 2, each inductor may be automatically controlled by a separate electromagnet. For automatic inductance control, inherent sensitivity of the controlled inductor or controlling electromagnet toward temperature changes for example, may be balanced against each other and thereby reduced.

The above electrical control of inductance also provides a simple arrangement for varying the band pass characteristics of selector networks. A coupling arrangement such as described in Fig. 2 but having electromagnet tuning of the inductor components may have a simple readily operated control knob for suitably varying the inductances. For example, the control can be connected to a balanced impedance network inserted in and controlling the electromagnet energizing supply and arranged so that as the mutual inductance is increased, the non-mutual inductances are correspondingly decreased to keep the selector circuits properly tuned. By mere adjustment of the control knob, the band width of the coupling circuit can then be selected as desired. The band width control may also be connected for automatic response to the signal level as by operation from the AVC circuits.

Fig. 11 shows one form of such a band width control system. Coils 3—1, 3—4 and 3—20 are connected for coupling between input circuit 93 and output circuit 94 and are associated with individual variable permeability cores 3—2, 3—5 and 3—21 as described in connection with Fig. 4. Positioned around each coil are individual variable flux generating windings 3—68, 3—69 and 3—70 connected to a constant voltage source 95 to form an adjustable current distributing bridge. Winding 3—70 for the mutual inductance coil 3—20 forms one magnet arm and the windings 3—68, 3—69 for the remaining inductance coils 3—1, 3—4 in parallel form another magnet arm of the bridge, which is completed by the potentiometer 96. As the potentiometer top is moved, current through one magnet arm decreases while current through the other magnet arm increases correspondingly, providing the desired band width control as explained above. Variable resistors 97, 98 in series in the separate circuits of windings 3—68, 3—69, serve to enable individual inductance adjustment of the corresponding coils 3—1, 3—4. The magnet windings such as 3—68 and 3—69 may be held on coil forms of electrically conductive material to improve the decoupling between the corresponding inductance coils.

According to a further phase of the invention the inductance coils themselves may be connected to generate the permeability-varying flux. This is readily accomplished using a D. C. flux generating current supplied to the inductance coil through a choke coil. In some cases the inductance coil may be connected in its utilization circuit by a blocking capacitor to isolate the D. C. flux generating current from the utilization circuit.

As indicated above, the inductor systems of the invention may be hermetically or non-hermetically sealed. The receptacles may be sealed in evacuated condition, or may be filled with any desired protective or inert medium such as inert gases or pitch.

Any number of inductors may be sealed in a single receptacle according to the invention, and although only one is illustrated in the constructions of Figs. 6, 7 and 8, more can be present as shown in connection with the other figures. Conversely the construction of Figs. 1 and 2 may have only a single inductor, if desired. Correspondingly any number of condensers may be sealed in the container. Where readily deteriorated condensers, such as those having a paper or fabric dielectric, are connected with an inductor system of the invention, their insertion in the sealed receptacle is particularly desirable and greatly lengthens their life.

While several exemplifications of the invention have been indicated and described above, it will be apparent to those skilled in the art that other modifications may be made without departing from the scope of the invention as set forth in the appended claims.

What is claimed is:

1. A variable inductance device comprising, an imperforate receptacle of metallic material provided with a deformable section, an inductive winding mounted in said receptacle, a core for said winding also mounted in said receptacle and formed of a magnetic material having a high permeability which is susceptible of variation in response to intensity changes of an ambient magnetic field, a permanent magnet having an orientation corresponding to that of said core and located adjacent one section of said receptacle in sufficient proximity to said core to produce an ambient magnetic field encompassing said core, and a mounting for said magnet including means for varying its spacing relative to said core comprising in part said deformable section, and means actuated from the outside of said receptacle for deforming said section thereby varying the intensity of said ambient field and also as a consequence the inductance of said winding.

2. A variable inductance device as defined in claim 1 in which said core and said permanent magnet both have elongated configurations.

3. A variable inductance device as defined in claim 2 in which the spacing varying means of said magnet mounting is of a character to effect an adjustable movement of said permanent magnet in the direction of its longitudinal dimension.

4. A variable inductance device as defined in claim 3 in which said elongated core is fixed in its relationship to said winding.

5. A variable inductance device as defined in claim 1 in which said core and said permanent magnet both have elongated configurations and said magnet mounting is of a character to position one end of said magnet adjacent one end of said core.

6. A variable inductance device as defined in claim 5 in which said magnet mounting is of a character to position said magnet in substantial alignment with said core.

7. A variable inductance device as defined in claim 6 in which the spacing varying means of said magnet mounting comprises an adjustable threaded pin in substantial alignment with said core and said magnet and in engagement with said magnet mounting.

8. A variable inductance device as defined in claim 9 including additionally a non-magnetic compression spring between said core and said permanent magnet urging said permanent magnet toward the deformable section of said receptacle.

9. A variable inductance device comprising, an imperforate receptacle, an inductive winding mounted in said receptacle, a core for said winding also mounted in said receptacle and formed of a magnetic material having a high permeability which is susceptible of variation in response to intensity changes of an ambient magnetic field, a permanent magnet having an orientation corresponding to that of said core and located adjacent one section of said receptacle in sufficient proximity to said core to produce an ambient magnetic field encompassing said core, and a mounting for said magnet including means for varying its spacing relative to said core, thereby varying the intensity of said ambient field and also as a consequence the inductance of said winding, said receptacle being of magnetic material and provided with a deformable section forming part of said spacing varying means, said core and said permanent magnet both having elongated configurations and both being mounted on the inside of said receptacle with their respective longitudinal dimensions in substantial alignment, said magnet being connected to said deformable section for movement in the direction of its longitudinal dimension by deformation of said section, and means actuated from the outside of said receptacle for deforming said section.

ROBERT L. HARVEY.
LESLIE L. BURNS, Jr.

REFERENCES CITED

The following references are of record in the file of this patent:

UNITED STATES PATENTS

| Number | Name | Date |
| --- | --- | --- |
| 1,896,510 | Given | Feb. 7, 1933 |
| 2,213,326 | Polydoroff | Sept. 3, 1940 |
| 2,302,893 | Roberts | Nov. 24, 1942 |
| 2,380,242 | Jewell | July 10, 1945 |
| 2,395,881 | Klemperer | Mar. 5, 1946 |